US011053090B1

(12) United States Patent
Noviello et al.

(10) Patent No.: US 11,053,090 B1
(45) Date of Patent: Jul. 6, 2021

(54) DOCUMENT SCANNER WITH ENVELOPE DISCRIMINATION AND DETECTION (71) Applicant: Imaging Business Machines LLC, Birmingham, AL (US)

(72) Inventors: Marc Noviello, Sterrett, AL (US); Jeremy Jowers, Birmingham, AL (US)

(*) Notice: Subject to any disclaimer, the term of this patent is extended or adjusted under 35 U.S.C. 154(b) by 50 days.

(21) Appl. No.: 16/294,482

(22) Filed: Mar. 6, 2019

Related U.S. Application Data (60) Provisional application No. 62/639,220, filed on Mar. 6, 2018.

(51) Int. Cl.
*B65H 7/12* (2006.01)
*H04N 1/12* (2006.01)
*H04N 1/00* (2006.01)

(52) U.S. Cl.
CPC ......... *B65H 7/125* (2013.01); *H04N 1/00039* (2013.01); *H04N 1/121* (2013.01); *B65H 2511/512* (2013.01); *B65H 2511/524* (2013.01); *B65H 2553/30* (2013.01); *B65H 2701/1313* (2013.01)

(58) Field of Classification Search
CPC ............... B65H 7/125; B65H 2553/30; B65H 2511/524; B65H 2511/512; B65H 2511/13; B65H 2701/1916; G03G 15/703; H04N 1/00039
See application file for complete search history.

(56) References Cited

U.S. PATENT DOCUMENTS

| | | | | |
|---|---|---|---|---|
| 5,861,646 A * | 1/1999 | Czesnik | ................. | B65H 7/125 250/559.4 |
| 6,115,509 A | 9/2000 | Yeskel | | |
| 6,212,130 B1 | 4/2001 | Brazeal | | |
| 6,511,064 B1 | 1/2003 | Phinney | | |
| 7,025,348 B2 | 4/2006 | Phinney | | |
| 7,654,521 B2 * | 2/2010 | Simonis | ................. | B65H 7/125 271/258.01 |
| 7,845,637 B2 * | 12/2010 | Shimazaki | ............... | B65H 7/12 271/259 |
| 8,631,922 B2 * | 1/2014 | Stone | ........................ | B65H 7/12 198/340 |
| 2003/0094748 A1 | 5/2003 | Chujo | | |
| 2012/0307282 A1 * | 12/2012 | Ishikawa | ................ | B65H 7/125 358/1.14 |
| 2017/0111524 A1 * | 4/2017 | Tajima | ............... | H04N 1/00037 |
| 2018/0285671 A1 * | 10/2018 | O'Neill | ................ | G07D 11/237 |
| 2020/0079608 A1 * | 3/2020 | Hall | ................... | H04N 1/00705 |

FOREIGN PATENT DOCUMENTS

| | | | |
|---|---|---|---|
| JP | 2015000804 A | * | 1/2015 |
| JP | 2017193390 A | * | 10/2017 |

* cited by examiner

*Primary Examiner* — Luis A Gonzalez
(74) *Attorney, Agent, or Firm* — Harris Beach PLLC (57) ABSTRACT

A system for detecting envelopes from multi-fed documents in a scanning system with a scanning track along which documents move laterally toward a scanning station having a plurality of spaced apart penetrating detectors across the scanning track. The scanners detect a leading edge as a single layer material, i.e. without an air gap and the interior as having an air gap in the document scanned. If a document has an interior air gap, but the leading edge does not, it is first assumed to be an envelope.

9 Claims, 9 Drawing Sheets

Commercial Flap    Square Flap    Wallet Flap

Side Seam    Policy    40

DOCUMENT SCANNER WITH ENVELOPE DISCRIMINATION AND DETECTION

BACKGROUND OF THE DISCLOSURE

Field of the Disclosure

The present disclosure is directed to a document scanner having a subsystem for the detection of the presence of an envelope in the scanning stream.

Description of the Related Art

Scanning of documents for the purpose of creating electronic images is well known in the art. An example is found in U.S. Pat. No. 6,115,509 to Yeskel.

Special considerations are required where the volume of documents is large and may include irregular shapes and/or documents which are not intended to be scanned at all. An irregular document may be detected when two documents are stuck together, known as a multi-feed or MF. The speed of processing is often so fast that a multi-feed will slow or stop the process.

Envelopes present a special problem. They are often kept integral with the documents to be scanned and sometimes used by the document organizer as a separator between various documents. Envelopes can often trick the scanner into believing that a multi-feed (MF) has occurred because they have similar characteristics, i.e. double layer thickness. Ultrasonic detection is a known tool in the prior art to detect the presence of documents, such as U.S. Pat. Nos. 6,511,064 and 7,025,348 to Phinney et. al., U.S. Pat. No. 6,212,130 to Brazeal et. al., and US Publication No. 2003/0094748 to Chujo et. al., but those disclosures are only background information and are insufficient to detect envelopes relative to other documents.

Therefore, there needs to be a way to detect that the document being scanned is not a multi-feed, but rather a discrete envelope which is being properly scanned. By detecting envelopes and distinguishing them from multi-feeds (two documents overlying each other), envelopes will not be flagged as errors and scanning can continue without the need to treat such documents as a misfeed. This will greatly increase the scanner throughput by eliminating a major source of false positives, because envelopes will no longer be detected as a positive misfeed.

BRIEF SUMMARY

The disclosure encompasses many embodiments. One such embodiment is detailed below in summary fashion. Please understand that this summary does not encompass the entire disclosure but is provided to assist the reader in reviewing the entire disclosure and claims which also constitute part of the disclosure.

Multi-feed detection is often accomplished by one or a series of spaced apart ultrasonic transmitter/receivers placed on both sides of a document as it passes by. Such detectors can identify the presence of a document, and further detect whether a document has a multi-feed by virtue of the fact that such feeds will likely have an air gap between the documents, albeit small. The air gap will only suggest that a MF has occurred. It is then necessary to detect whether the MF is two documents or an envelope. Ultrasonic detectors will produce varying signal levels in response to the presence or absence of air gaps. Air gap degrade the signal level much more greatly that double ply layers. More sophisticated sensors, such as used in medical ultrasound, may be able to actually see the air gap as a sharp interface between layers of different materials and send back echoes with greater precision, making envelope detection even more reliable. Envelopes have the same characteristic of a two document multi-feed which can be detected if the detectors identify a multi-feed with all edges aligned between the suspected two documents. That is, the first and second documents overlap nearly perfectly and the size of the document is less than that of an expected full sized sheet. This means that the document is already detected as unusual in shape, but then it is further detected as in near exact alignment with the suspected document under it. Because the main body of an envelope is double thickness, a pair of overlapping sheets of irregular size is most likely an envelope and not a multi-feed. Furthermore, when the ultrasonic detectors are positioned to detect the very edge of the suspect document, they may detect that the edges have no air gap, but if an air gap is detected after encountering the edge, that is a strong indication that an envelope has been detected rather than two overlapping sheets, though it is possible that a single sheet may be detected due to occlusion of a sensor/detector. An envelope having a folded edge will not show an air gap at its leading edge but immediately thereafter it will. Two sheets overlying each other will have an air gap at their leading edge.

In the alternative an envelope has an aligned and sealed leading (or any other) edge as it passes through the air gap between the ultrasonic transmitter and receiver. The ultrasound wraps around the leading edge of the envelope and the sensor detects a "single" ply for the period of time that the document is only partially occluding the sensing area. The width of the sensing area is preferably constant and the speed is a known variable. Based on these inputs, the envelope detection algorithm registers this single output and uses it as a part of the envelope detection algorithm. Once the envelope is covering the entire sensing area of one or more sensors/detectors, then the ultrasonic device(s) sense a double ply sheet. An envelope will have a predictable response during this transition in milliseconds due to the near-perfect alignment of the leading edge of an envelope. A multi-feed will have a longer transition time due to the inherent slight misalignment of the leading edges of two or more multi-fed documents (i.e. two documents pulled together perhaps overlapping). The trailing edge of the envelope detector behaves in the same manner; multi-fed documents have a longer transition time between entry into the sensor area (single feed detected) and complete coverage (multi-feed detected), primarily because they tend to be skewed.

Further disclosed is the step of detecting whether the document has folded edges on at least two sides, thereby further confirming that it is an envelope. Folded edges can be detected by their density and/or lack of air gap and adjacent an area devoid of a document (unused part of the feeder track) and adjacent an air gap/multi-ply region.

Further disclosed is the step of detecting whether the document has an envelope flap shape, thereby further confirming that it is an envelope. Envelope flaps can be known shapes in a look up database or have known characteristics, like diagonal shape. They will generate a known trace from the sensor/detector. By scanning both sides simultaneously, the back side of the envelope (where the flap is) will always be known.

Further disclosed is the step of detecting whether the document has a postage stamp, thereby further confirming that it is an envelope. A postage stamp is any kind of post office element, an adhesive stamp, machine stamp, cancellation, bar code, etc.

Further disclosed is the step of whether the document has a return address field, thereby further confirming that is an envelope.

Further disclosed is the step of whether the document has a shape known to be an envelope size by comparing the shape to a database of known envelope shapes, thereby further confirming that is an envelope.

Further disclosed is the step of whether the document has a postal code, thereby further confirming that is an envelope.

Further disclosed is the step of including the step of scanning both sides of the document to detect whether the document has an envelope flap shape, thereby further confirming that it is an envelope.

Many other features and combinations are disclosed and claimed.

BRIEF DESCRIPTION OF THE SEVERAL VIEWS OF THE DRAWINGS

FIG. 5 is a schematic view of a scanner array sequentially detecting the presence of various multi-feed combinations. (The white box is the underlying document with the cross-hatched item being an overlying document). Pattern 1 is a narrow sticky note attached to a longer document. Pattern 2 is a larger narrow sticky note attached to a longer document. Pattern 3 is a sticky note covering the majority of the underlying document, but not all of it. Pattern 4 is a sticky note of identical size and alignment with the document beneath it. The numerals "0", "1" and "2" which appears in line with "To app from driver" are intended to indicate the number of layers of materials detected, so a "2" indicates two layers with an air gap and 0 indicates no layer. The indicators 0, 1, 2 can also mean: 0=single layer, 1=more than one layer which does not extend the entire extent of the other layer and 2=two more layers from end to end (fully extent coverage).

DETAILED DESCRIPTION

The present disclosure relates to improvements in document image scanners, most particularly high speed high volume scanners where high throughput is needed. If such a scanner encounters a misfeed or specifically, a multi-feed (MF, i.e. where two or more documents overlie each other), the throughput of the scanner must be slowed down with the error or exception. A multi-feed may be identified and the process will indicate a possible error and the flow must be stopped or the document reinserted at a later time.

Figure 1:
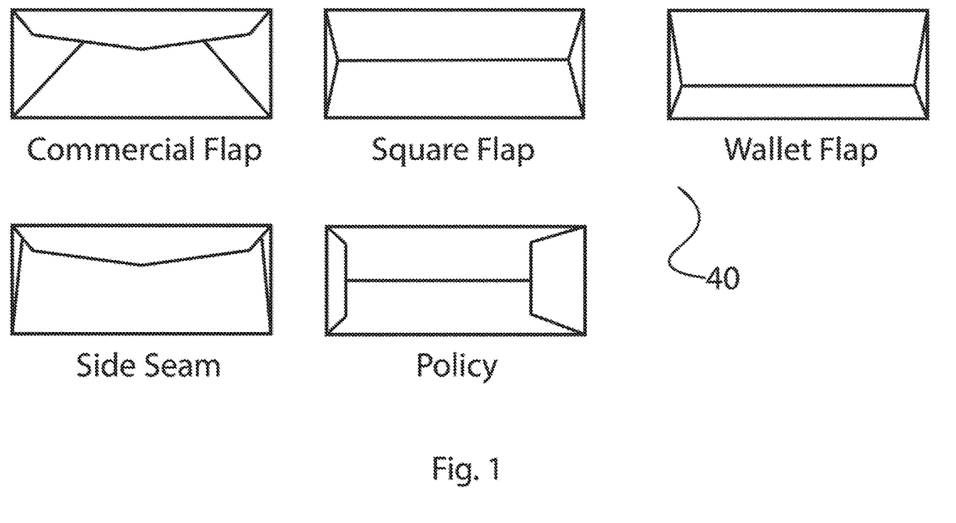
FIG. 1 is a schematic view of various envelope types.

The problem is that multi-feeds can be considered false positives when they are actually envelopes or other multi-layer documents. Envelopes are particularly problematic because they are very common. Customers often think that the envelope should be scanned with its related document or use them for separators between documents. Therefore identifying and segregating envelopes would increase throughput, because they are not MF (multi-feed) or errors and should not be flagged as such. Envelopes 40 come in many sizes and shapes such as shown in FIG. 1, but they all have the characteristic that they have at least 1) double thickness, and 2) are folded at edges. They may have windows which can have a plastic transparent cover or be entirely paper with merely an open/cut out window. These types will be detected somewhat differently. By discriminating between envelopes and other MF circumstances, throughput of the scanning process will be greatly enhanced.

Figure 2:
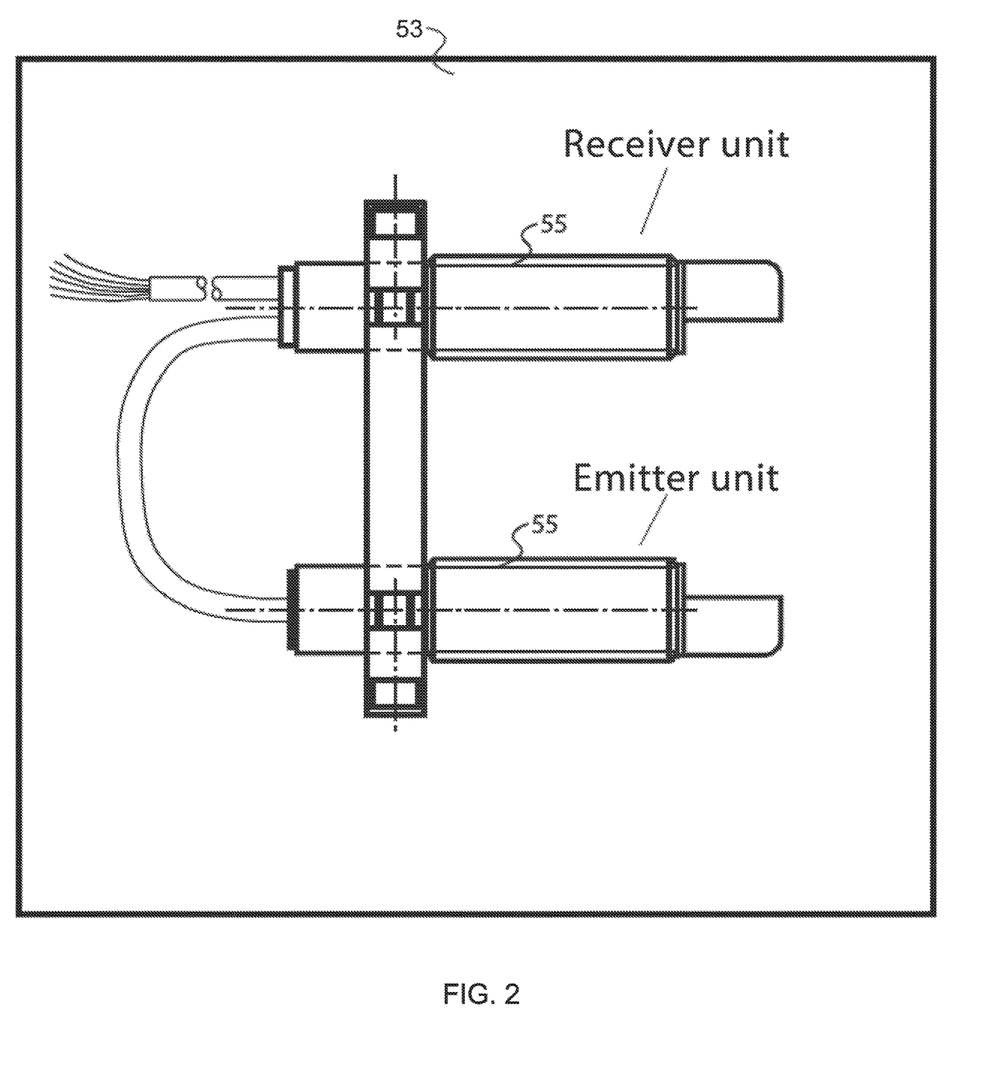
FIG. 2 is a perspective view of an ultrasonic right angle sensor capable of penetrating documents.

To detect double layers of paper, various means can be used. A scanning station 53 with array of ultrasonic detectors 55 placed side by side spaced apart is effective. FIG. 2 illustrates such an ultrasonic sensor 55 Model UDC 18gma-400-3e3 made by Pepperl Fuchs. Other sensors/detectors are possible including but not limited to optical, infrared, microwave/radar, and sensor types not yet invented but which would be able to measure thickness and/or air gap. It is noted that two sheets of paper, even if directly atop each other will still have an air gap between them (see U.S. Pat. No. 6,212,130 to Brazeal which is hereby incorporated by reference for background information), and it is this air gap which provides the most reliable information of a multi-feed. Thickness scanning with or without air gap, is also a possible means of envelope detection.

Of course envelopes will also have an air gap between their layers (except at their folded edges). In addition the envelope size or shape can provide supplementary information which can reveal that they are not another document, but rather an envelope. Further, if the sensors take a sufficient number of scans, and are sufficiently precise, they could detect a folded edge, (no air gap) and thereby define the boundaries of the envelope. An alternative way to detect an envelope is to detect the change in the number of plies/layers of material as the document enters the sensor(s). Often it will be skewed, but in any case, the leading edge, because it is folded over material, will register as a single ply/layer, where there is no air gap. But as the document moves along the sensor(s) will detect the air gap meaning two ply/layers with an air gap. The sensor detects an air gap between layers because of the discontinuity in the material. Typically, the switch from a single to multi ply/layer indicates an envelope or alternatively a double feed perfectly aligned, which is rare. In practice, the likelihood of two documents exactly aligned atop each other and staying perfectly aligned/overlapping while moving along a scanner feed belt through the detector is very remote. Most often such overlying documents will shift out of alignment due to belt vibrations. A double feed out of alignment is easier to detect by known means.

If a scanner detects a double layered document, it normally assumes that it is a MF and sends an error code. By differentiating envelopes which are always double layered, they need not be flagged as errors. The basic method of differentiation is to determine if the double layer covers the full extent of the document scanned. In most cases that will be an envelope but there could be circumstances where it is in fact, a MF of two documents of identical shape, one atop the other, though as mentioned, mere vibration of the feed belt will likely shift one of the documents and they won't stay completely registered. In that case, or in addition to this primary differentiation methodology, a secondary method of sub-differentiation is useful. For example, Optical Character Recognition (OCR) can be used to determine the print on the document fits an envelope pattern (for example, postal code, central address, upper corner return address, postal markings, and stamps/machine postage). The shape of the document can be determined by the sensors and then matched against a look up table of known envelope shapes and known envelope flap shapes. Used together, the flap shape plus OCR would detect front and rear faces of an envelope reliably.

It is also possible to use the sensors to detect the fold lines of an envelope. The fold lines do not have an air gap, but adjacent one side of the fold will be an air gap and the other side of the fold will typically be outside the envelope area (i.e. no document). So, once fold lines are detected, it is clear that it must be an envelope and not two sheets of paper/documents (MF) which are perfectly aligned atop each other. Other methods are possible, such as detecting only a single document of double ply/layer, thereby confirming that a double sheet was atop a single sheet and the double sheet document was smaller in size than the single sheet below. That would have a high probability of being an envelope especially if it had defined edges which are aligned with no air gap. An envelope should reliably have at least some edges with no air gap and an interior space with at least some air gap. An open window envelope will have an interior region with no air gap but it will be bounded by regions of air gap and a peripheral edge(s) with no air gap.

Figure 3:
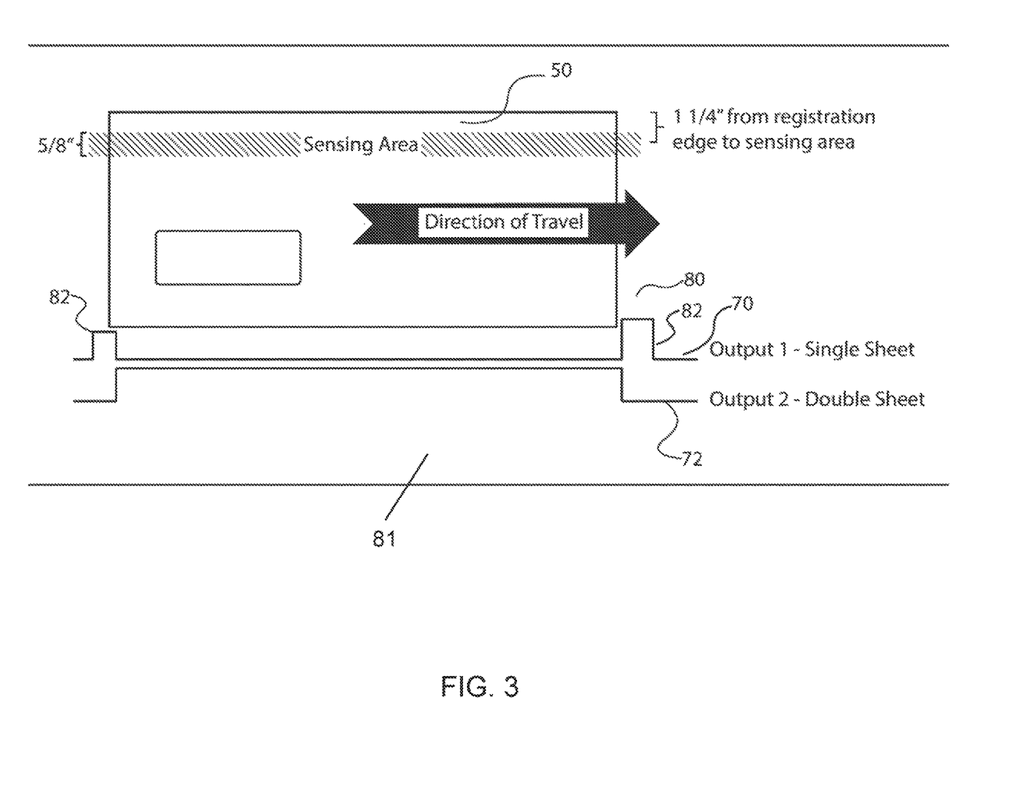
FIG. 3 is a schematic view of an envelope and associated sensor signal output from the sensor/detector.
Figure 6:
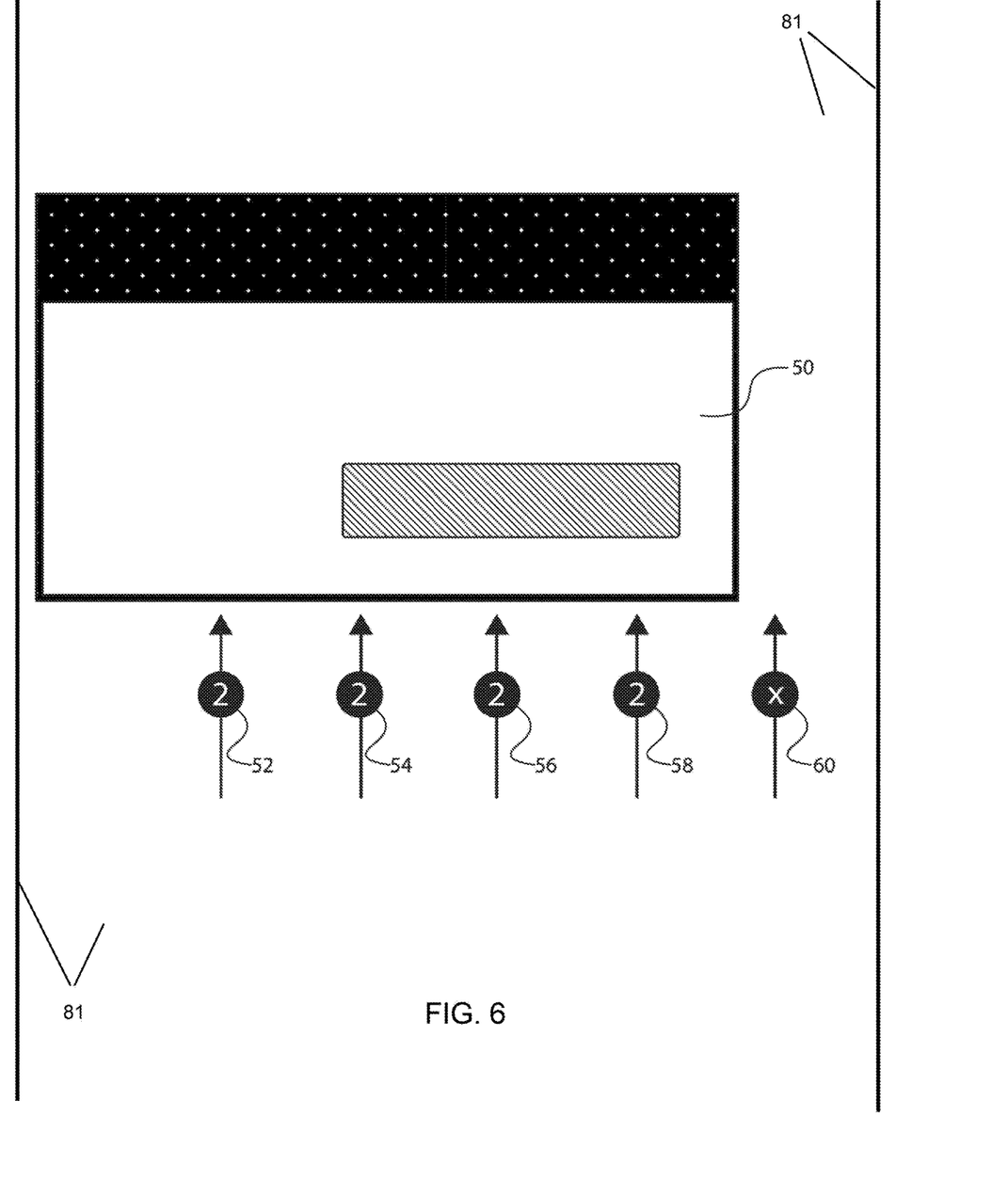
FIG. 6 is top view of a window envelope and sequential sensors/detectors across the length thereof.

FIGS. 3 and 6 show a cut out open window number 10 US standard envelope 50 as it travels past sensors 52, 54, 56, 58, 60 (FIG. 6) on a scanning track 81. Inside the circles and arrow are representative sensor response values (2, 2, 2, 2, x) where X indicates that no document is present and 2 indicates that two layers with an air gap are present. In FIG. 3, the output of the sensors is graphed as signals 70, 72. Signal 70 is a trace detecting the envelope where it overlies a larger sheet 80. Signal trace 72 is the trace for the underlying sheet 80 where it is not occluded by envelope 50. Peak 82 in trace 80 allows the two traces to be differentiated. As a result, the processor associated with the scanner can determine that a smaller document, having multiple sheets of material overlies a larger document and thus is likely to be an envelope. Note, since the preferred detector scans lines at multiple points simultaneously, it may detect an area where there is only a single sheet, such as with an envelope with a cut out window. Because such window is typically surrounded by layers with an air gap, the cut out can be determined to be a window which further indicates that the document is an envelope. Even envelopes with plastic covered windows, may report a different response at the detector, but it will typically still indicate two layers, though they might register differently from two paper layers.

Figure 4:
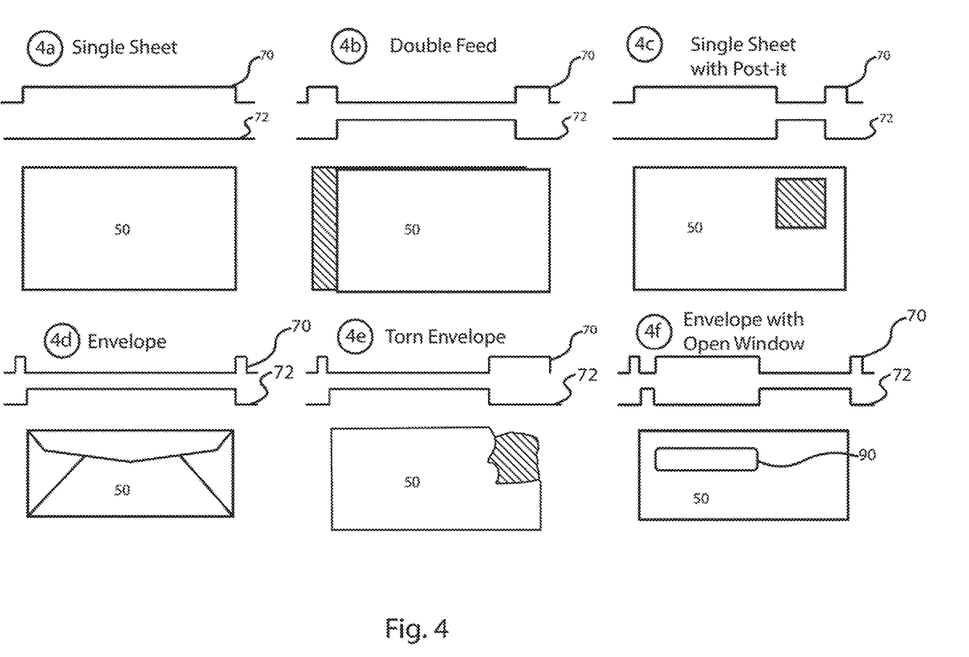
FIG. 4 has columns 4a-4f are a series of scanned documents and their associated signal output from the sensor/detector as follows: 4a is a full (letter) sized single sheet of paper, 4b is a letter sized sheet of paper with a multi-feed where the second sheet is exactly overlying the first sheet, 4c is a letter sized sheet with a sticky note attached thereto, 4d is an intact envelope, 4e is an envelope with a portion torn away, and 4f is an intact window envelope.

FIG. 4 has a column 4a which illustrates the traces 70, 72 for a single sheet alone. Trace 72 shows no second sheet. Traces rise as the sensor detects a layer.

FIG. 4 has a column 4b which shows two identically sized sheets fed together and completely aligned. (The diagram does not show the documents aligned/fully overlapping, but the graphic is only for purposes of making clear that there are two layers). Note, that this could be a MF of two documents or an envelope. If an envelope, the sensor might detect three layers, which would most likely indicate an envelope adjacent or under/above an odd shaped document. Further information (secondary methods) might be needed to ascertain if it was an envelope.

FIG. 4 has a column 4c which is a sticky note on top of a larger sheet. Note that the traces easily define the sticky note. It would not likely be an envelope because parts of the scan show only a single ply, unlike an envelope.

FIG. 4 has a column 4d which shows a large envelope. Trace 72 shows that there is only one edge so it is most likely an envelope. If there was a further identically shaped document thereunder, it would show up as three plies/layers if the sensor was configured for that type of detection, and could be interpreted as a triple multi-feed or a large envelope plus document. In any case, it is a MF. If the sensors catch the folded edges of the upper document, it will almost certainly be identified as an envelope.

FIG. 4 has a column 4e which is a torn envelope atop a document. Only one set of traces is shown, but if there were more sensors, the tear would be identified and processor logic could recognize it as a torn document and the small size or folded edges would identify it as an envelope.

FIG. 4 has a column 4f which is a window envelope. Because the window 90 is easily identified and matched to a shape database by the processor, it will be identified as a window envelope with no other likely alternative.

Figure 5:
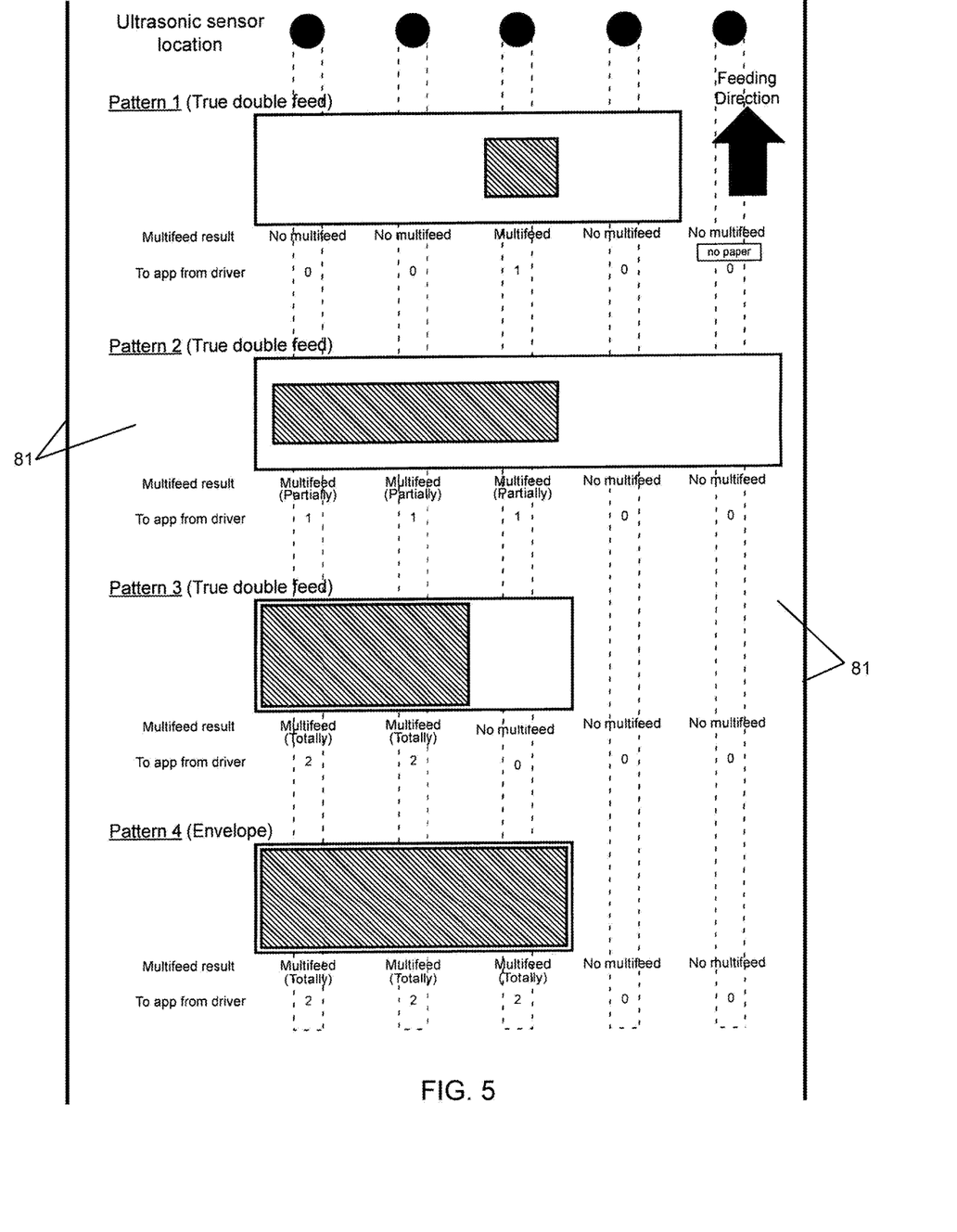

FIG. 5 shows a series of possible patterns where a multi-feed has occurred with various size overlying documents base on scanner signals.

Pattern 1 is a narrow sticky note attached to a longer document. It cannot be an envelope because it is double ply/layer only in small area.

Pattern 2 is a larger narrow sticky note attached to a longer document. The same rules apply as in Pattern 1.

Pattern 3 is a sticky note of full width matching the underlying document but shorter in length or shorter in width (any aspect ratio). For the same reasons as Pattern 1, is not an envelope.

Pattern 4 is a document with double ply/layer throughout. It is likely to be an envelope. Confirmation of that can be made in ways indicated above such as OCR, determination if it is a triple ply or finding folded edges.

The information from the driver is the software driver which receives a signal from the sensor and outputs a numerical value which the processor via software determines has a known pattern which indicates a probable output. The output is then sent to the user/operator to indicate the nature of the error.

Figure 7:
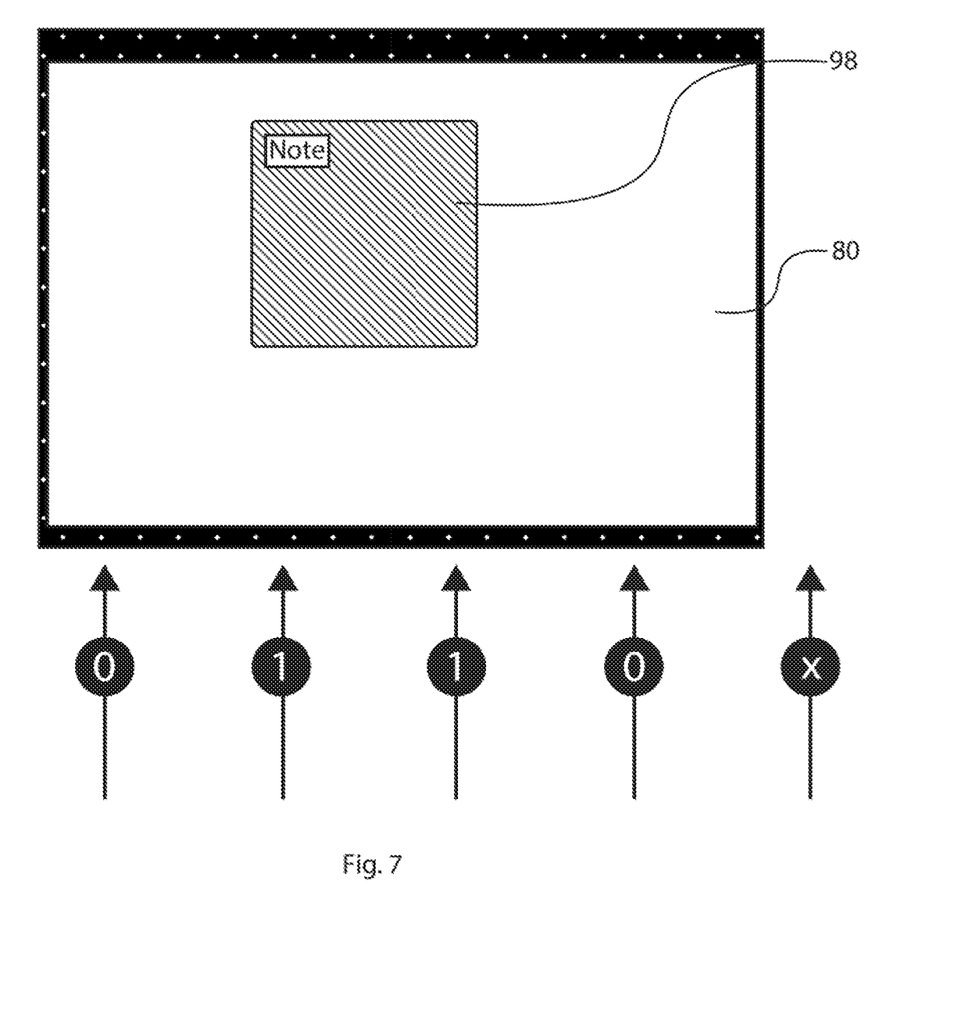
FIG. 7 is a top view of a letter sized sheet with a small sticky note thereon.

FIG. 7 shows a full letter sized document 80 with a sticky note 98 partially occluding the document.

Note that a sticky note is almost always single ply and is thus distinguishable from an envelope in the number of plies. Also, a sticky note is smaller than the underlying document, so it can't be an envelope. Sticky notes can be reported to the operator as an error/exception, to determine if they should be rescanned with the note removed.

Figure 8:
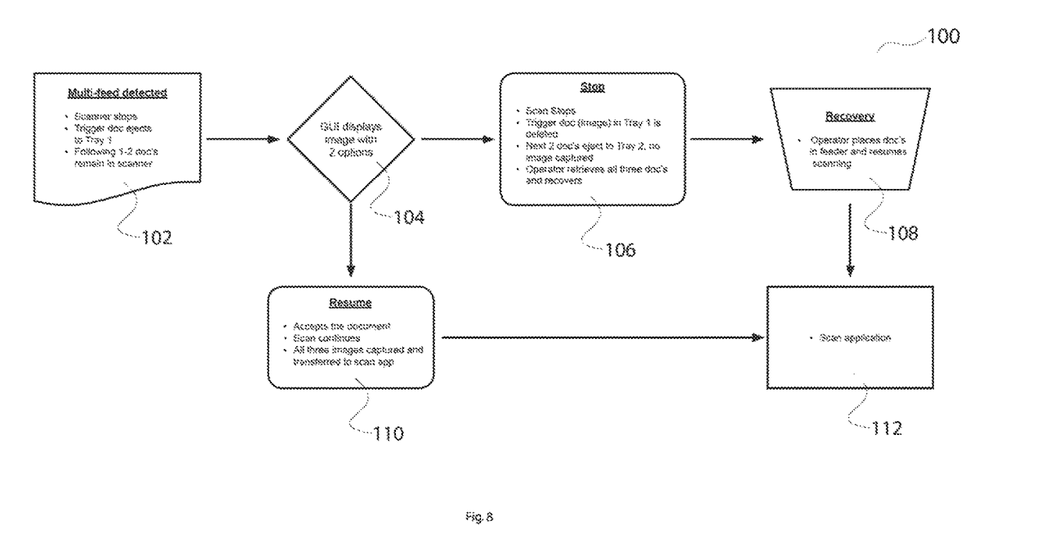
FIG. 8 is a flow chart of one process of the disclosure.
Figure 9:
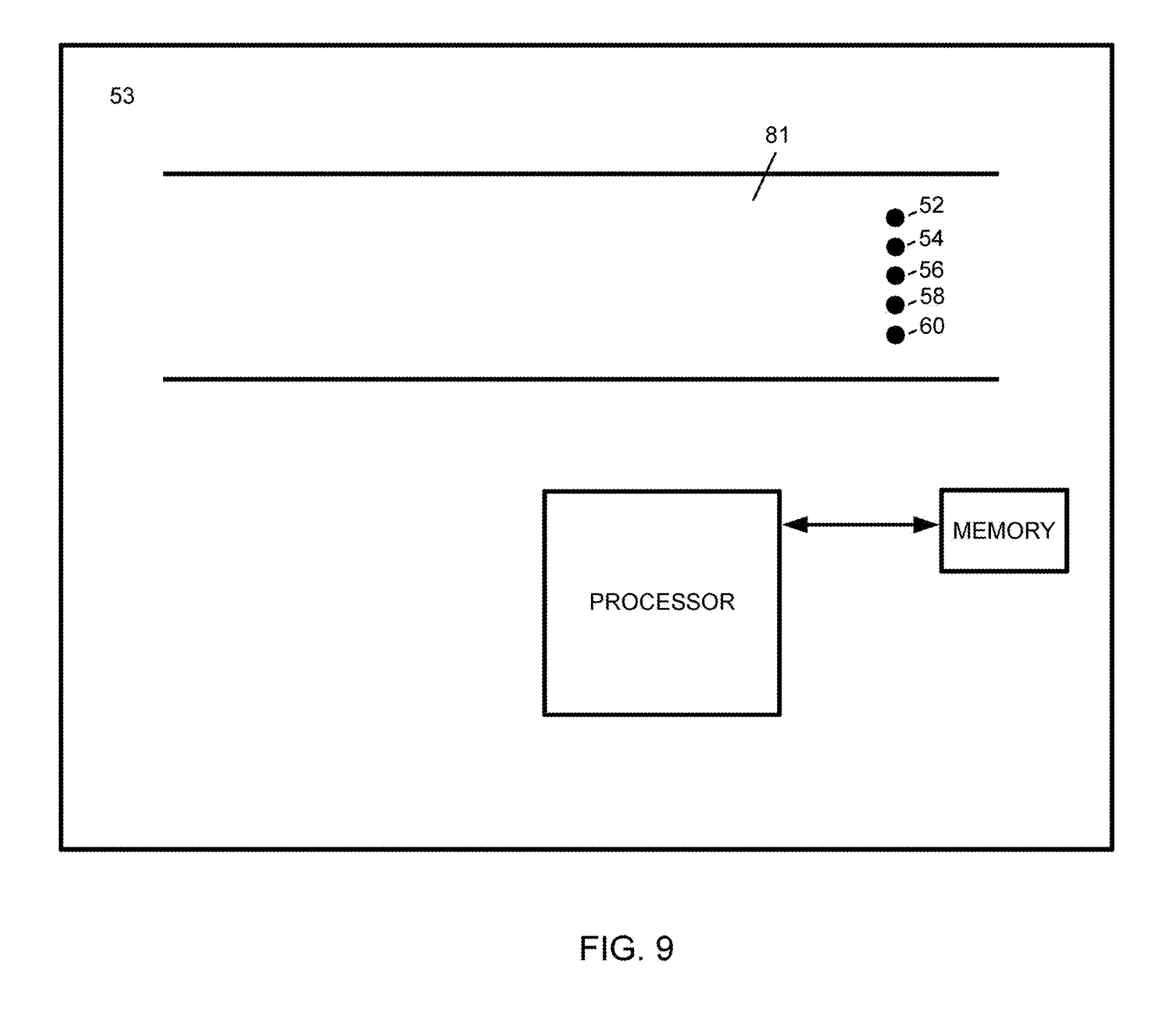
FIG. 9 is an exemplary system block diagram.

FIG. 8 is a flow chart 100 of one part of the operation. A multi-feed is detected 102 which could result in the document being ejected into a "reject"/exception tray for further consideration. At 104, the system may display to the user on a console two or more options: 106, to stop the scanner, eject suspect documents into an eject/exception tray, have the operator inspect its contents 109 and replace the document into the scan flow, and restart scanning 112. In the alternative, the operator may resume 112 on the assumption that the error code generated was a false positive, and resume scanning 112.

The disclosure also includes a method and a system for detecting and differentiating between envelopes, multi-feed (MF) (i.e. overlapping documents which are often considered a misfeed), and other combinations.

For example, a system for scanning documents to discriminate between envelopes and other multi-fed (MF) documents, may have any or all of the following elements:

optionally, a moving scanning track along which documents move laterally toward a detection station;

a detection station which includes penetrating scanners, such as ultrasonic transmitters/receivers with a plurality of spaced apart penetrating beam detectors preferably transversely across the scanning track;

the detectors which are capable of measuring air gaps between documents overlying each other by looking for the response from the interface between layers and air provide an output signal corresponding to the existence and perhaps count of air gaps and boundaries detected;

a processor and memory can be used for storing data obtained from said detectors, and a look up table can be used to determine if the stored data is indicative of an envelope or MF.

The detectors when configured to detect an air gap in a document scanned, such data can be further processed as follows: in one configuration, if an edge, most often the leading edge (though the system can be configured to detect trailing or side edges) of a document is determined by the detector has lacking an air gap, but the detectors detect an air gap in the document after the leading edge, i.e. in the interior of the document bounded by the edges, then the document is most likely an envelope and not a MF because an envelope will have a fold at least some of its peripheral edges which has no air gap. It is noted that the detection and differentiation of the leading or other edge may not take place instantly. Rather it may take some time after most of the sensors have completed their scan to determine if the signal drop due to air gaps is deemed to be sufficient to determine that the item is an envelope. To be safe, secondary tests, (postal codes, etc.) can be used to increase reliability.

If the document is not identified as a misfeed then the document can be further analyzed as follows:
 a. the document is analyzed for any of the following indicia which would be indicative of an envelope:
  1 an analysis of the shape of the document corresponding to a known envelope shape, such as size and/or shapes stored in a look up table; or
  2 the presence of indicia corresponding to a postal address; or
  3 the presence of a postal stamp; or
  4 the presence of an envelope window; or
  5 other indicia indicative of an envelope versus a document;
 b. if at least one other indicum is found, then the document may be classified as an envelope with higher certainty and scanning of other documents continues uninterrupted;
 c. if the document is not classified as an envelope, then it is classified as a misfeed and is flagged as misfeed and reported to an operator for further intervention or other steps taken to flag and resume scanning.

Alternative methods are also possible. For example a method of scanning documents using a document scanner having penetrating detectors located across a scanning track which moves documents therealong, the method detects or differentiate the presence of an envelope alone or overlying or underlying another document during document scanning comprising any or all of the steps of:
 a. detecting the outer boundaries of a document moving along the scanning track, said boundaries defining an interior space of the first document;
 b. detecting a leading or other edge of a document;
 c. determining if such edge has an air gap;
 d. upon scanning further along the document past the leading edge, detecting the presence of an air gap in said interior space of the document as it is scanned, said air gap being indicative of a document with multiple layers;
 e. if the multiple layers are detected in the interior but no air gap is detected at least one edge, the document is most likely an envelope and scanning continues without indication of a misfeed;
 f. if however, there is an air gap at an edge, it is most likely a misfeed;
 g. if there is an air gap at an edge and an air gap in the interior, then it is also likely a misfeed;
 h. a window envelope may have a no air gap edge, an air gap interior and a portion of the interior which has no air gap (the window) and would still be flagged as an envelope.

It is possible to look at other edges since an envelope might have an open flap at one edge but not another. By considering multiple edges, an open flap envelope will still be identified as an envelope.

To further enhance differentiation reliability other steps can be added. For example, adding the step of detecting whether the document has folded edges on at least one, two, three or four sides, thereby further indicating that it is an envelope.

To further enhance differentiation reliability the step of detecting whether the document has a known envelope flap shape, thereby further confirming that it is an envelope may be added.

To further enhance differentiation reliability the step of detecting whether the document has a postage indicum (stamp/machine stamp, etc. types of which may be in a look up table), further confirming that it is an envelope.

To further enhance differentiation reliability the step of detecting whether the document has an address field indicum (such as a known postal code formatted number, a postal bar code, or similar), thereby further confirming that it is an envelope may be added.

To further enhance differentiation reliability the step of detecting whether the document has a shape known to be an envelope size by comparing the shape to a database of known envelope shapes, thereby further confirming that it is an envelope may be added.

To further enhance differentiation reliability the step of scanning both sides of the document to detect whether the document has an envelope flap shape, thereby further confirming that it is an envelope may be added.

It is also possible to use a method of scanning documents using a document scanner having penetrating detectors which moves documents, a method of detecting and differentiating the presence of an envelope being scanned having any or all of the following elements:
 a. detecting the outer boundaries of a document moving along the scanning track, the boundaries defining an interior space of the first document;
 b. determining if at least one edge of the document includes an air gap between layers thereof;
 c. determining if the interior of the document includes an air gap between layers thereof;
 d. if an air gap is detected in the interior but not the edge, then designating the document as an envelope.

To further enhance differentiation reliability the step of determining whether the document has folded edges on at least two sides, thereby further indicating that it is an envelope may be added.

Other methods are possible, such as a method of scanning documents using a document scanner having penetrating detectors across a scanning track which moves documents therealong, a method of detecting and differentiating the presence of an envelope being scanning having any or all of the following steps of:
 a. detecting the outer boundaries of a document moving along the scanning track, said boundaries defining an interior space of the first document;
 b. determining if an edge of the document includes an air gap between layers thereof;
 c. determining if the interior of the document includes an air gap between layers thereof;
 d. if an air gap is not detected in the interior and not the edge, then designating the document as misfeed.

The description of the invention and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A system for scanning documents to discriminate between envelopes and other multi-fed (MF) documents, the scanning system comprising:
 a. a scanning track along which documents move laterally toward a detection station;
 b. a detection station including plurality of spaced apart penetrating detectors across the scanning track, said detectors being capable of measuring air gaps between documents overlying each other and providing a numerical output signal corresponding to air gaps and edges detected;
 c. a processor and memory for storing data obtained from said detectors,
 d. wherein, detectors are configured to detect an air gap in a document scanned, such data is further processed as follows:
  1. if a leading edge of a document is determined by the detector to be lacking an air gap, but the detectors detect an air gap in the document after the leading edge, then the document is not initially identified as a misfeed;
  2. if the document is not identified as a misfeed then the document is further analyzed as follows:
   a. the document is analyzed for any of the following indicia which would be indicative of an envelope:
    1. an analysis of the shape of the document corresponding to a known envelope shape by said processor; or
    2. the presence of indicia corresponding to a postal address as determined by said processor; or
    3. the presence of a postal stamp as determined by said processor; or
    4. the presence of an envelope window as determined by said processor;
   b. if at least one indicium is found, then the document is classified as an envelope and scanning of other documents continues;
   c. if the document is not classified as an envelope, then it is classified as a misfeed and is flagged as a misfeed and reported to an operator for further intervention.

2. A method of scanning documents using a document scanner having a side by side spaced apart penetrating detectors across a scanning track which moves documents therealong, a method of detecting and differentiating the presence of an envelope overlying or underlying another document during document scanning comprising the steps of:
 a. detecting a leading edge of a document moving along the scanning track;
 b. upon scanning further along the document past the leading edge, detecting the presence of an air gap in an interior space of the document as it is scanned, said air gap being indicative of a document with multiple layers;
 c. if said multiple layers are detected in the interior space of the document, and:
  no air gap is detected at folded edges on at least two sides of said document, identifying the document as an envelope and scanning continues without indication of a multi-feed, or
  no air gap is detected at, at least one edge of the document, and the document has a known envelope flap shape as identified by a processor of the document scanner based on a scan of the document, identifying the document as an envelope and scanning continues without indication of a multi-feed.

3. A method of scanning documents using a document scanner having penetrating detectors across a scanning track which moves documents therealong, a method of detecting and differentiating the presence of an envelope being scanned comprising the steps of:
 a. detecting two or more edges of a document moving along the scanning track, said two or more edges defining an interior space of the first document;
 b. determining if an edge of the document indicates a folded edge by registering as a single layer;
 c. determining if the interior of the document includes an air gap between layers thereof;
 d. if an air gap is detected in the interior and a folded edge at the edge of the document, and:
  determining by said processor if the document has a postage indicium, then designating the document as an envelope, or
  determining by said processor if the document has an address field indicium, then designating the document as an envelope.

4. The method of claim 3, wherein said step d. comprises, if an air gap is detected in the interior and a folded edge at the edge of the document and determining by said processor if the document has a known envelope flap shape, then designating the document as an envelope.

5. The method of claim 3, wherein said step d. comprises, if an air gap is detected in the interior and a folded edge at the edge of the document and determining by said processor if the document has a shape known to be an envelope size by comparing the shape to a database of known envelope shapes, then designating the document as an envelope.

6. A method of scanning documents using a document scanner having penetrating detectors across a scanning track which moves documents therealong, a method of detecting and differentiating the presence of an envelope being scanned comprising the steps of:

a. detecting two or more edges of a document moving along the scanning track, said two or more edges defining an interior space of the first document;
b. determining if an edge of the document includes an air gap between layers thereof;
c. determining if the interior of the document includes an air gap between layers thereof;
d. if an air gap is detected in the interior and not at the edge, designating the document as an envelope, and if an area within the interior space has no air gap surrounded by areas within the interior space which have an air gap, designating the document as an envelope with a window.

7. A method of scanning documents using a document scanner having a side by side spaced apart penetrating detectors across a scanning track which moves documents therealong, a method of detecting and differentiating the presence of an envelope overlying or underlying another document during document scanning comprising the steps of:
a. detecting a leading edge of a document moving along the scanning track;
b. upon scanning further along the document past the leading edge, detecting the presence of an air gap in an interior space of the document as it is scanned, said air gap being indicative of a document with multiple layers;
c. if the multiple layers are detected in the interior and no air gap is detected at, at least one edge of the document, and:
  the document has a postage indicum as identified by a processor of the document scanner based on a scan of the document, identifying the document as an envelope and scanning continues without indication of a multi-feed, or
  the document has an address field indicum as determined by an OCR process running on a processor of the document scanner based on a scan of the document, identifying the document as an envelope and scanning continues without indication of a multi-feed.

8. A method of scanning documents using a document scanner having a side by side spaced apart penetrating detectors across a scanning track which moves documents therealong, a method of detecting and differentiating the presence of an envelope overlying or underlying another document during document scanning comprising the steps of:
a. detecting a leading edge of a document moving along the scanning track;
b. upon scanning further along the document past the leading edge, detecting the presence of an air gap in an interior space of the document as it is scanned, said air gap being indicative of a document with multiple layers;
c. if the multiple layers are detected in the interior and no air gap is detected at, at least one edge of the document, and:
  determining by a processor of the document scanner based on a scan of the document whether the document has a shape known to be an envelope size by comparing the shape to a database of known envelope shapes, identifying the document as an envelope and scanning continues without indication of a multi-feed, or
  detecting whether the document has a postal code by an OCR process running on a processor of the document scanner based on a scan of the document, identifying the document as an envelope and scanning continues.

9. A method of scanning documents using a document scanner having penetrating detectors across a scanning track which moves documents therealong, a method of detecting and differentiating the presence of an envelope being scanned comprising the steps of:
a. detecting two or more edges of a document moving along the scanning track, said two or more edges defining an interior space of the first document;
b. determining if an edge of the document indicates a folded edge by registering as a single layer;
c. determining if the interior of the document includes an air gap between layers thereof;
d. if an air gap is detected in the interior and a folded edge at the edge of the document, and:
  determining by said processor if the document has a postal code, then designating the document as an envelope, or
  determining by said processor if the document has an envelope flat shape, then designating the document as an envelope.

* * * * *